United States Patent [19]

Fischer, III

[11] Patent Number: 4,495,808
[45] Date of Patent: Jan. 29, 1985

[54] PARACHUTE PROFILER

[75] Inventor: Ferdinand J. Fischer, III, Houston, Tex.

[73] Assignee: Shell Oil Company, Houston, Tex.

[21] Appl. No.: 417,269

[22] Filed: Sep. 13, 1982

[51] Int. Cl.³ .................... G01B 21/20; G01B 21/30
[52] U.S. Cl. ............................. 73/432 R; 33/178 F
[58] Field of Search ............... 73/432 B, 49.5, 432 G, 73/432 R, 623; 33/178 F, 147 K, 178 R; 15/104.06 B, 104.06 R; 254/134.4

[56] References Cited

U.S. PATENT DOCUMENTS

| 1,035,994 | 8/1912 | Mueller | 15/104.06 R |
| 2,508,659 | 5/1950 | Brown | 15/104.06 R |
| 3,755,908 | 9/1973 | Ver Nooy | 33/174 R X |
| 3,810,384 | 5/1974 | Evans | 73/623 X |
| 3,973,441 | 8/1976 | Porter | 73/105 X |

FOREIGN PATENT DOCUMENTS

| 1043643 | 11/1958 | Fed. Rep. of Germany | 33/178 F |
| 2263485 | 7/1973 | Fed. Rep. of Germany | 15/104.06 B |
| 2264422 | 10/1973 | Fed. Rep. of Germany | 73/49.5 |

Primary Examiner—Stephen A. Kreitman
Assistant Examiner—Tom Noland

[57] ABSTRACT

A collapsible parachute is propelled through a pipeline by flow of the pipeline contents. The parachute tows a pipeline profiling device which may include spring loaded feeler arms. The parachute collapses in order to pass obstructions or constrictions in the pipeline, and the feeler arms of the profiling device retract to avoid becoming stuck in the pipeline.

3 Claims, 1 Drawing Figure

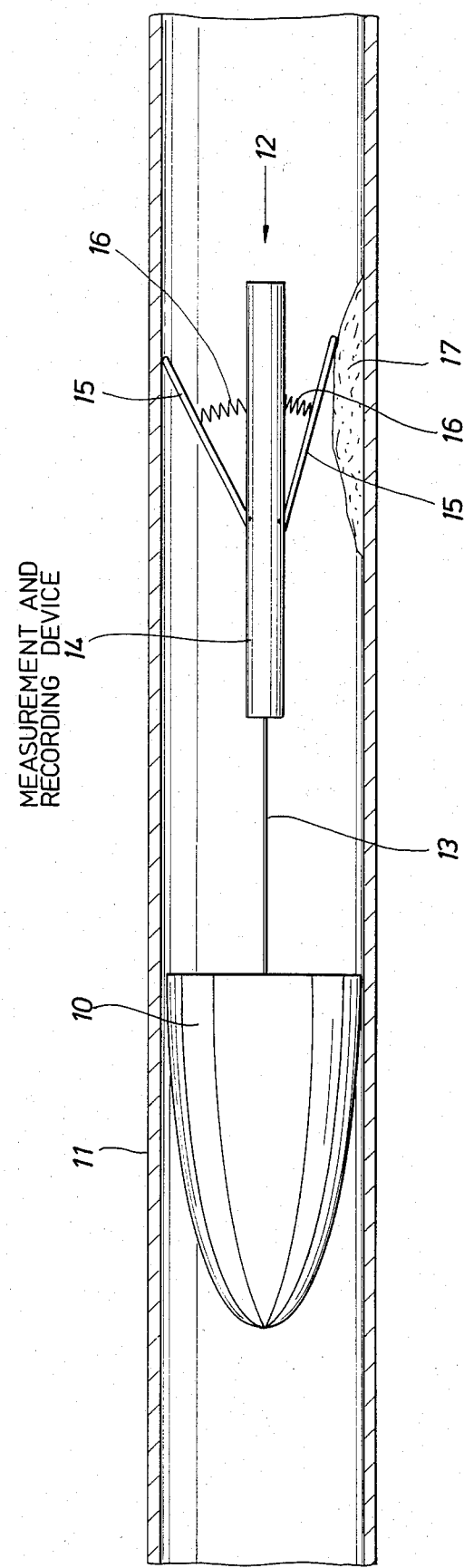

PARACHUTE PROFILER

BACKGROUND OF THE INVENTION

The present invention relates, among other things, to a device for providing indications of deviations of an inner wall of a pipeline from a nominal cross-sectional configuration. However, the device may be utilized to sense any location-specific property of the pipeline as the profiler or other sensor(s) passes through the pipeline.

Internal calipering of buried pipeline or of offshore pipeline is desirable for several reasons, e.g., to locate and repair damaged or obstructed sections of a pipeline which might be hazardous to safe operation. Thus, a pipeline may be damaged as it is laid, especially during the back fill operation, so that it may have serious dents, out of round sections, etc. Damaged areas of the pipeline can cause a flow restriction which in some cases will stop or damage standard pigs or the damaged areas may cause stress concentration points susceptible to failure. Inspection of this type is also desirable to locate areas damaged during line operation. Pipelines at river crossings or other underwater locations are especially subject to such damage.

The provision of a mechanism to internally caliper a pipeline presents several problems, depending upon the environment involved. Thus, the mechanism should be capable of continuously traversing long lengths of line without excessive wear which would either cause it to fail or to give erroneous indications of the internal configuration of the pipeline. It should also give full coverage of the inner wall of the pipeline; it should be able to pass through curved portions of the pipeline without indicating departures from such normal configuration; and it should be able to pass side openings, valves, etc. without being damaged.

Accordingly, it is a primary purpose of this invention to provide a mechanism which solves these problems and which can be propelled along the pipeline by fluid flowing through the pipeline so that the mechanism is a self-contained unit, capable of calipering over great distances and detecting deviations in inner pipe wall configurations as they may occur from place to place along the pipeline and capable also of sensing other location-specific properties of the pipeline, if desired.

Other purposes, advantages and features of the invention will be apparent to one skilled in the art upon review of the following.

Applicant is not aware of any prior art references which, in his judgment as one skilled in the pipeline art, would anticipate or render obvious the novel pipeline sensor of the instant invention; however, for the purposes of fully developing the background of the invention and establishing the state of the requisite art, the following references are set forth: U.S. Pat. Nos. 3,755,908; 3,685,158 and 4,243,099.

BRIEF DESCRIPTION OF THE DRAWING

FIG. 1 provides a view of the parachute profiler of the present invention located inside a pipeline.

SUMMARY OF THE INVENTION

The present invention provides a fluid propelled pipeline sensor including a folding umbrella-shaped tow means, means for sensing a location-specific property of the pipeline, and means connecting the tow means and sensing means. Preferably, the tow means is a parachute. In addition, the invention provides a method for propelling a sensor through a pipeline by disposing a folding umbrella-shaped tow means inside the pipeline, attaching means for sensing a location-specific property of the pipeline to the tow means, and propelling the tow means and sensing means through the pipeline by fluid flow.

DESCRIPTION OF PREFERRED EMBODIMENTS

In accordance with this invention, a fluid-propelled pipeline sensor is provided which has, as a part thereof, a folding umbrella-shaped tow means, such as a parachute, a sensing means which may be resiliently biased outwardly to be in sliding engagement with the inner wall of the pipeline, and a towing bridle connecting the two. When the sensor moves past a deviation in the inner wall of the pipeline, such as a dent, part of the sensing means is moved laterally to provide an indication of the deviation. In addition, any other location-specific properties of the pipeline may be sensed. For example, localized flow obstruction due to accumulation of pipeline corrosion product or other foreign solid material can be traversed and sensed. The sensor is arranged so that it provides substantially full circle coverage of the inner wall of the pipeline and is mounted so that the stresses involved in sliding it along and in contact with the pipeline wall are not a problem. The sensor is made from a material adapted to withstand the wear and stresses involved in maintaining sliding contact with the pipeline wall over long distances.

The apparatus of the invention also preferably includes an integrating device for summing the extent of movement of diametrically opposite sensing means so that when they sense movement in equal amounts but in opposite directions, as when the device traverses a bend or an ell, the output is zero thereby avoiding a spurious indication of a deviation.

In addition, the apparatus includes means for impeding flow of pipeline fluid since the apparatus is propelled by such fluid along the pipeline. Such means generally is a folding umbrella-shaped tow means. More specifically, the tow means is in the shape of a parachute which is composed of a rugged material, for example, fiber network-reinforced plastic film and which readily folds to pass any obstruction in the pipeline, without causing undue wear to the material of the parachute, the parachute thus being much less inclined to sticking than a standard pig.

Referring now to the drawings, a parachute 10 is shown located inside a pipeline 11 in such a manner that the direction of pipeline fluid flow 12 will engage the open side of the parachute and propel it forward in the pipeline. The parachute in turn is connected by a towing bridle 13 to a sensing means 14 which may be a profiler body containing electronics and a recorder or acoustic transponder (not shown) and which may have feeler arms 15 attached. Feeler arms 15 are mounted upon springs 16. When an obstacle 17 occurs in the pipeline, the spring fingers retract, thereby signifying the appearance in the pipeline of the obstacle.

The towing parachute 10 preferably meets certain parameters. It must collapse to flow past obstructions or constrictions in the pipeline, and the material of the parachute is resistant to abrasion and to decomposition by the pipeline contents. It is aerodynamically stable in all configurations.

The towing bridle or harness 13 is configured such that it does not impede action of the parachute 10. In addition, it does not interfere with the pipeline profiler 14 or measurements of the pipeline by calipers or feeler arms 15.

The pipeline profiler mechanism 14 and 15 provides at least 6 to 8 radial measurements of the pipeline profile. Orientation is desirable but not essential and the apparatus can easily be provided with a ballast system (not shown). Transducers may be attached to the profiler body 14 and can be calibrated to indicate radial movements, i.e., pipeline constrictions. In addition, the profiler must allow for substantial pipeline constriction without getting stuck in the line, such as the above noted parameters for the parachute 10.

The profiler recording system preferably includes four transducers (not shown) which provide an analog signal which can be recorded. for example, on magnetic tape, or digitized and then recorded and/or acoustically transmitted. Longitudinal position or location of the device is usually known accurately enough from pumping rates and elapsed pumping time. However, acoustic pulses may be provided which, along with the known wave speed, can indicate the position of the apparatus in the pipeline.

The foregoing description of the invention is merely intended to be explanatory thereof. Various changes in the details of the described apparatus may be made within the scope of the appended claims without departing from the spirit of the invention.

What is claimed is:
1. A fluid-propelled pipeline sensor comprising:
an umbrella-shaped tow means which is a fiber-reinforced plastic film resistant to abrasion and to decomposition by pipeline contents and collapsible to allow passage of the tow means past a substantial pipeline restriction or obstruction;
a profiler for sensing a location-specific property of the pipeline, the profiler having retractable feeler arms which allow passage of the profiler past a substantial pipeline restriction or obstruction; and
means connecting the tow means and the sensing means.
2. The pipeline sensor of claim 1 wherein the profiler is for measuring the deviations of an inner wall of the pipeline from a nominal cross-sectional configuration.
3. The pipeline sensor of claim 1 wherein the connecting means is a towing bridle.

* * * * *